United States Patent Office 3,511,644
Patented May 12, 1970

3,511,644
PROCESS FOR REDUCING AND CARBURIZING MELTING OF METALLIC MATERIAL IN A ROTARY FURNACE
Erik Anders Åke Josefsson and Erik Axel Bengtsson, Borlange, Sweden, assignors to Stora Kopparbergs Bergslags Aktiebolag, Falun, Sweden, a company of Sweden
No Drawing. Filed July 5, 1966, Ser. No. 562,482
Claims priority, application Sweden, July 9, 1965, 9,136/65
Int. Cl. C21b *11/00, 11/08, 13/08*
U.S. Cl. 75—40                                                                 11 Claims

ABSTRACT OF THE DISCLOSURE

A process has been provided for smelting, reducing and carburizing primarily an iron material in a rotary furnace when using liquid and gaseous fuel as the smelting means. As the carburizing medium, a coke layer is maintained on the iron containing material. In order to prevent the combustion of the carburizing medium such as coke breeze, i.e. the undue disturbing of the reducing conditions and carbon introduction into the iron material, the undue combustion of the coke layer by water formed from the combustion of the fuel (which fuel consists merely of carbon and hydrogen) is prevented by directing and incompletely burning the fuel immediately above the carbonaceous layer on top of the melt puddle and slag layer, thus forming carbon monoxide and hydrogen. Thereafter, the incompletely burned fuel is burned further in a second zone by supplying oxygen thereto and forming carbon dioxide and water thus giving off the heat necessary to smelt the material. The carburizing and reducing conditions are kept from being disturbed by utilizing the combustion product from the first zone, i.e. carbon monoxide and hydrogen formation as a shield between the carburizing and reducing layer and the second combustion zone. The proper relationship of the desired, combustion sustaining materials in the two zones is established by the correct introduction of oxygen in the proper amounts in respect to the hydrocarbon fuel and in respect to the carbon monoxide and hydrogen in each of the combustion zones. For example, in the second combustion zone, oxygen is introduced countercurrently to the flue or exit gas to insure complete combustion and thus to enhance the efficiency of the process.

---

The present invention relates to a method for reducing and carburization melting of metallic materials, particularly metals of the iron group, preferably iron materials, such as scrap iron, sponge iron or iron oxide materials, in a rotary furnace; in this furnace a charge, comprising the material, possibly inorganic additions, such as required for slag forming and alloying and preferably solid carbonaceous matter, is more or less continuously supplied and processed and the heat required for the process is at least partly generated by the burning of hydrocarbon. The invention can be also utilized for melting of, for instance, nickel material, iron-nickel material and iron-manganese material.

According to a proposal, (U.S. patent application Ser. No. 451,046, now abandoned), for the production of liquid pig iron and steel from non-melted, mainly metallic iron material, like scrap iron or sponge iron, by melting in a rotary furnace with horizontal or inclined axis of rotation and with the aid of possibly preheated oxygen-containing gas and fuel, which at least to some extent consists of carbonaceous solid material, the melting process is accomplished in the presence of such an excess of the carbonaceous solid material, that a continuous carbon bed is maintained, which shields off the metal from the gas space of the furnace, and the oxygen-containing gas is brought into the furnace chamber in such a way, that so much CO is formed by direct reaction between oxygen or $CO_2$ and the carbon of the bed, that, on the one hand, the ratio $CO_2/(CO+CO_2)$ in the exhaust gas from the furnace chamber is at least ⅔ and, on the other hand, said exhaust gas contains at the most 10% by volume $O_2$. This process is easily accomplished if the solid carbonaceous material is poor in volatiles, for instance consists of coke, and there are no difficulties in attaining a substantially complete combustion in the furnace of the emerging gas with a coke layer maintained on the surface of the bath. This coke layer which is necessary in order to attain the wanted relatively high carbon percentage in the bath, constitutes fuel as well as carburization means.

It is desirable, in a reducing and carburization melting process substantially of the above mentioned type to be able to use liquid and gaseous fuel at least for heat generation. However, tests made to accomplish a melting process as outlined above with the aid of hydrocarbons, supplied by conventional burners, have shown that it is impossible with an acceptable degree of combustion of the gas to attain that degree of carburization or such reducing conditions as to attain the required and high percentage of carbon in the melt as is needed for desired results. If a coke layer is maintained on the surface of the charge, carburization may certainly be obtained, but the coke of this layer reacts intensely at the same time with the completely burnt gases from the hydrocarbon burner, so that carbon monoxide, even in a great excess is obtained in the gas that leaves the furnace, resulting in correspondingly low efficiency of the supplied combustible material (hydrocarbon and coke).

One should expect, in the first hand, that the above mentioned disadvantages in using hydrocarbons could be avoided by introducing the unburnt hydrocarbon against the coke bed, whereby, as it departs therefrom, it would act as a protection of the bed against oxidation. Further, it would be expected that oxygen required for the combustion could be supplied by injection into the gas space above the bed. However, tests made for accomplishing a melting process in this way, have not led to a satisfactory degree of combustion of the directed gas.

It is an object of the invention to make it possible in melting processes of the described type to use liquid or gaseous fuel, that is fuel which consists mainly of carbon and hydrogen, with a good economy and a high degree of combustion and without jeopardizing the reducing conditions required during the melting process. It is a particular object of the invention to make it possible to melt pulverulent sponge iron in an economic way. It is a further object of the invention, in the process of carburization or reduction with the aid of a layer of coke or the like situated or floating upon the bath in the furnace, to provide sufficient amount of heat without substantial combustion of the coke by the supplied gaseous oxygen.

In order to attain these objects of the invention and other easily realized advantages a process is used in which the hydrocarbon is burnt in two steps or zones in the furnace, and at least that step of the combustion of the hydrocarbon, in which substantial amounts of water are formed, is carried out and the combustion gases formed are withdrawn substantially out of contact with said charge. The process is preferably performed in such a way in the rotary furnace, that a combustion of the hydrocarbon in a first zone is performed incompletely so as to form substantially carbon monoxide and hydrogen and in a second zone, suitably situated at a distance from the first one, concluded so as to form carbon dioxide and vaporous water, and that the gases in the rotary furnace are directed in such a way, that the charge is substantially shielded off from the gases of combustion generated in the second zone of combustion. The shield is achieved, for instance, by directing the primarily burnt gas or gas burnt in the first zone ($CO+H_2$) into such a flow in the furnace chamber that it shields off at least the major part of the charge, which has a preferably continuous layer of coke on top of it, from the secondary combustion zone. The charge in the furnace, which gradually may be increased by feeding fresh charge ingredients thereto, may thus be treated in a way suitable for the desired metallurgical result which is to be achieved in each particular case without a chemical effect generated by the final combustion of the hydrocarbon material.

In order to safely supply the charge components during the proceeding of the process, the material to be melted, should be supplied to the furnace in said first zone where the combustion is incomplete. The shielding is thus especially important in that part of the furnace, where the solid goods for melting, e.g. pulverulent sponge iron, is supplied to the surface of the bath (the coke layer), as the goods to be melted, at least before being melted, but often also before it has passed down into or through the slag, is highly disposed to absorb oxygen especially from $H_2O$, whereafter the metal oxides formed react with the coke layer. The net result is obviously the same as from a direct oxidation of this layer.

Various agents, such as slag formers and alloying materials, may be supplied to the rotary furnace to achieve a suitable slag composition or for the improvement of the material being processed. At least those of said agents, which are apt to be oxidized at the temperatures in question, are supplied, possibly together with the material to be processed, to the furnace in a part thereof separated from the secondary combustion zone.

In one embodiment of the invention at least a portion of the oxygen-containing gas, such as commercial oxygen, usually more than 80% $O_2$, required for the final combustion or second zone combustion is supplied to the furnace through that end of the furnace from which the main part of the flue gases are removed.

When adjusting the oxygen-fuel ratio in the primary combustion zone care should be taken that this ratio is chosen at least so high that considerable amounts of hydrocarbons do not leave this stage or zone undecomposed, but yet not so high that considerable amounts of $H_2O$ are formed already there. In practice it has been found suitable that the amount of oxygen supplied to the first zone primary combustion is between 90 and 170% of that theoretically required for the conversion of the hydrocarbons only to carbon monoxide and hydrogen.

It is, of course, important for the production and the production economy that also the primarily incompletely burnt gas is secondarily burnt to $CO_2$ and $H_2O$ within the furnace with a high degree of completeness. The oxygen required for that purpose is supplied by one or more separate feed pipes (lances) in such a way that the secondary combustion mainly takes place at a distance from the charge (the coke layer) and the flue gas can leave the furnace without coming into contact therewith. Furthermore, a vigorous turbulence in the secondary combustion zone is required in order to achieve a complete combustion. This is suitably achieved by introducing at least part of the secondary oxygen into the furnace in a direction opposite to that of the finally burnt flue gas streaming out from the furnace so that the stream of oxygen is forced to turn back and thereby more effectively mix with the incompletely burnt gases.

The method according to the invention is primarily suitable for melting metal material, especially pulverulent sponge iron, but can also be used in the reduction of iron ore according to, for instance, the U.S. Pat. No. 3,169,055.

If the ore then is supplied to the furnace in a zone with a strongly reducing gas, accomplished in accordance with the invention, this gas may contribute not only to satisfy the demand for heat in the process while maintaining the same level of efficiency but also perform a certain part of the reduction work, which otherwise must be performed by the bed of solid carbon material. Thus, it is possible to replace part of the required solid reduction agent with gaseous or liquid hydrocarbons.

The process according to the invention is carried out in a rotary furnace with horizontal or inclined axis of rotation and refractory lining, which may be chosen basic, neutral or acid according to the nature of the process. The solid materials are supplied to the furnace continuously or batchwise. Suitably a small amount of molten material is retained in the rotary furnace from one melting operation to the other, whereby the furnace, in case of melting finely disintegrated material, may be allowed to rotate already from the beginning of the melting process with a relatively high speed, for instance 15–40 r./min., the speed being, as a rule, the lower the greater the portion of solid materials is in relation to that of liquid materials in the furnace. If the charge mainly consists of solid materials the rotational speed is held low, i.e. at 5–15 r./min. until a molten path has been formed. The speed is also held low in the beginning after feeding large-piece scrap-iron or the like to the furnace, and the speed is increased as the melting proceeds. The rotary furnace may have an opening in one of the end walls or in both of them. According to one operating embodiment of the invention the furnace has an opening in each end wall, and the burner for incomplete hydrocarbon combustion projects through an opening, through which processing agents and material to be processed are fed, while the gas required for the final combustion is fed through the other end wall opening, through which also the main portion of the burnt gases are removed.

EXAMPLE 1

In a horizontal rotary furnace lined with tar dolomite, after tapping 25 tons liquid pig iron from a previous heat, 1 ton coke, 4 tons of slag and 5 tons of liquid pig iron are retained in the furnace. The coke then forms a continuous bed upon the liquid slag.

During rotation of the furnace with a speed of 25 r.p.m. sponge iron containing 87.4% metallic iron and having a total Fe-content of 89.2% is then supplied continuously to the furnace through a water-cooled feed pipe. Through the same feeder there is additionally supplied coke breeze containing 5% moisture and 85% carbon and 15% ashes in the dry substance and burnt lime with a CaO-content of 90%.

A water-cooled oxygen-oil-burner is inserted through an opening in the rear end wall of the furnace and 98% oxygen gas is injected through a water-cooled tuyere through the mouth of the furnace. As oil common fuel oil may be used, e.g. heavy oil (Bunker C), containing 85% C, 11% $H_2$ and 2.5% S. The oil is supplied to the burner preheated to 110° C.

The exhaust gases from the furnace are sucked out through the mouth.

During 50 minutes there was supplied to the furnace:

13.8 tons sponge iron
800 kg. (kilograms) coke
712 kg. lime
980 l. (litres) oil
1860 Nm.³ (normal cubic meters) oxygen gas, 750 Nm.³ of which are introduced through the oil burner.

The melting is then interrupted and 4.7 tons of slag are tapped off, while the coke is retained in the furnace.

Then the melting is continued as in the first period during further 50 minutes under continual supply of:

13.8 tons sponge iron
800 kg. coke
712 kg. lime
985 l. oil
1860 Nm.³ oxygen gas, 700 Nm.³ of which are introduced through the oil burner.

The temperature of the iron before tapping is 1380° C. and 25 tons of pig iron are tapped in a ladle. The tapped iron has a carbon content of 4.2%.

The coke bed containing 1 ton of coke, the slag, amounting to 4 tons, and a quantity of 5 tons of liquid pig iron are retained in the furnace for next heat.

EXAMPLE 2

In the same furnace as in the previous example 1 ton of coke, 2.5 tons of slag and 5 tons of liquid pig iron are retained after tapping. The coke then forms a continuous bed on the liquid slag.

A batch of scrap iron weighing 5 tons is then charged through the mouth of the furnace.

The furnace is then rotated during 5 minutes with a speed of 10 r.p.m., and during the rotation oxygen gas and oil are supplied to the furnace through a water cooled burner inserted through a central opening in the rear end wall of the furnace, while the solid raw materials, as coke breeze, burnt lime and sand, are continuously supplied through the mouth of the furnace through a water cooled feeder pipe, and oxygen through a water cooled tuyere. The coke breeze, the burnt lime and the oxygen gas have the same properties as those of Example 1. The sand is common sea sand containing about 80% $SiO_2$. After 5 minues the speed is increased to 30 r.p.m. and after further 15 minutes of blowing 750 kg. slag are tapped off from the furnace at a temperature of 1350° C. in the bath.

From the beginning of the heat and up to this moment the following has been supplied to the furnace, in addition to the scrap iron:

334 kg. coke breeze
33 kg. burnt lime
17 kg. sand
418 l. oil of same quality as in the previous example
808 Nm.³ oxygen gas, 290 Nm.³ of which are introduced through the oil burner.

After slag tapping a further quantity of 10 tons of scrap iron is charged with a charging machine and during the continued melting the furnace is rotated at a speed of 30 r.p.m. for 35 minutes. During this time the following is added:

583 kg. coke breeze
58 kg. burnt lime
29 kg. sand
731 l. oil
1406 Nm.³ oxygen gas, 600 Nm.³ of which are introduced through the oil burner.

After this period a further interruption is made in the melting and 10 tons of scrap iron are charged into the furnace.

During further 35 minutes the following is added to the furnace during rotation at 30 r.p.m.:

583 kg. coke breeze
59 kg. burnt lime
29 kg. sand
731 l. oil
1406 Nm.³ oxygen gas, 550 Nm.³ of which are introduced through the oil burner.

At a bath temperature of 1350° C. 25 tons of pig iron containing 3.7% C. are tapped. At the tapping 1 ton of coke, 2.5 tons of slag and 5 tons of liquid pig iron are retained in the furnace, and a new heat can be started.

EXAMPLE 3

In the same furnace as in the preceding examples 18.2 tons of fine grained magnetite concentrate containing 66.8% Fe, 3.4% $SiO_2$, is continuously fed through the water cooled feeder pipe under rotation at a speed of 30 r.p.m. during a blowing time of 2 hours and 20 minutes. There is additionally supplied:

4.1 tons coke breeze of the same quality as in Examples 1 and 2
930 kg. burnt lime as in Example 1 and 2
1090 l. oil as in Examples 1 and 2
3950 Nm.³ oxygen gas, 820 Nm.³ of which are introduced through the oil burner.

After this the reduction is interrupted and 3.2 tons of slag are tapped.

The reduction is continued for further 2 hours and 20 minutes as in the preceding period by continuously feeding:

18.2 tons concentrate
4.1 tons coke breeze
930 kg. burnt lime
1090 l. oil
3950 Nm.³ oxygen gas, 800 Nm.³ of which are introduced through the oxygen-oil-burner.

After this 25 tons of pig iron containing 4.0% C are tapped at a temperature of 1350° C.

1.5 tons of coke, 6 tons of slag and 1 ton of liquid pig iron are retained in the furnace for the next melting period.

What is claimed is:

1. A process for reducing and carburization smelting of ferrous material, in a rotary furnace having a melting zone extending along the length of the furnace and having an opening at each end thereof comprising the steps of:
    establishing in said furnace a melt puddle, a slag layer and a carbonaceous material layer;
    introducing the ferrous material, slag forming materials and metal refining additives into said furnace;
    intorducing a carbonaceous material into said furnace as a reducing medium and maintaining the same as a layer on said melt puddle and slag layer;
    maintaining under rotation in said furnace said melt puddle and said carbonaceous layer, together with said formed slag layer between the melt puddle and carbonaceous layer;
    introducing into said furnace at one end thereof, directing towards and along the carbonaceous layer, a hydrocarbon fuel together with a first stream of an oxygen containing gas, the oxygen in said gas being in a ratio to the fuel between 90 and 170% of that theoretically required for the conversion of the hydrocarbons in said fuel to form carbon monoxide and hydrogen, thereby producing a reducing atmosphere zone above the melt puddle, slag layer, and carbonaceous layer;
    introducing a second stream of an oxygen containing gas, countercurrently to and spatially above said fuel being burned with the first stream of the oxygen containing gas, through at least one tuyere at the opposite end from said first end of said furnace;
    maintaining a combustion zone by combusting said carbon monoxide, hydrogen and unconverted fuel with said second stream of oxygen containing gas spatially above said reducing atmosphere zone;
    removing flue gas from the furnace from said opposite end; and
    recovering iron rich in carbon content.

2. The process according to claim 1 and wherein during the process sequence before the recovery of said carbon rich iron, slag is tapped and additional ferrous material is introduced in said furnace zone and said process continued.

3. The process according to claim 1 and wherein a portion of said iron rich in carbon is removed from said furnace zone and the remainder maintained as a starter for a next heat.

4. The process according to claim 1 and wherein the metal refining additives are introduced in the puddle via the carbonaceous layer without exposure to said combustion zone.

5. The process according to claim 1 and wherein the ferrous material is introduced in the furnace zone as pulverulent sponge iron.

6. The process according to claim 1 and wherein the recovered iron rich carbon has at least 3.7% carbon by weight.

7. The process according to claim 1 and wherein the hydrocarbon fuel is Bunker C oil.

8. The process according to claim 1 and wherein the introduced ferrous material is scrap iron.

9. The process according to claim 1 and wherein the introduced ferrous material is a fine grained magnetite concentrate.

10. The process according to claim 1 and wherein the introduced carbonaceous material is coke breeze.

11. The process according to claim 1 and wherein the introduced ferrous material besides iron contains nickel or manganese material.

References Cited

UNITED STATES PATENTS

| | | | |
|---|---|---|---|
| 1,160,822 | 11/1915 | Beckman | 75—40 X |
| 1,752,374 | 4/1930 | Durrer et al. | 75—43 |
| 2,756,137 | 7/1956 | Kocks | 75—40 |
| 2,978,318 | 4/1961 | Kalling et al. | 75—43 |
| 3,157,489 | 11/1964 | Wiberg | 75—40 |
| 3,169,055 | 2/1965 | Josefsson et al. | 75—40 |
| 3,326,670 | 6/1967 | Bratton | 75—43 X |

HENRY W. TARRING II, Primary Examiner

U.S. Cl. X.R.

75—38, 43, 48